US012331912B2

(12) United States Patent
Waddell et al.

(10) Patent No.: US 12,331,912 B2
(45) **Date of Patent: *Jun. 17, 2025**

(54) LIGHTING DEVICE HAVING MOVEABLE, NON-INCANDESCENT LAMP STICKS AND A METHOD OF OPERATING THE LIGHTING DEVICE

(71) Applicant: Latin-Negocio, LLC, Frisco, TX (US)

(72) Inventors: Brewster Waddell, Frisco, TX (US); Robert Landers, Allen, TX (US)

(73) Assignee: Latin-Negocio, LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,387

(22) Filed: Aug. 1, 2023

(65) Prior Publication Data

US 2023/0375167 A1 Nov. 23, 2023

Related U.S. Application Data

(63) Continuation of application No. 17/538,580, filed on Nov. 30, 2021, now Pat. No. 11,713,869.

(Continued)

(51) Int. Cl.

*F21V 23/00* (2015.01)
*F21S 9/02* (2006.01)

(Continued)

(52) U.S. Cl.

CPC .............. *F21V 23/003* (2013.01); *F21S 9/02* (2013.01); *F21V 3/02* (2013.01); *F21V 23/06* (2013.01);

(Continued)

(58) Field of Classification Search

CPC .......... F21V 23/003; F21V 3/02; F21V 23/06; F21V 25/00; F21V 19/0025; F21L 4/08;

(Continued)

(56) References Cited

U.S. PATENT DOCUMENTS

| | | | |
|---|---|---|---|
| 9,879,834 | B1 | 1/2018 | Carpenter et al. |
| 10,342,078 | B2 | 7/2019 | Jiang et al. |

(Continued)

FOREIGN PATENT DOCUMENTS

| | | | |
|---|---|---|---|
| CN | 110707829 | A | 1/2020 |
| GB | 1313723 | A | 4/1973 |

*Primary Examiner* — Eric T Eide

(57) ABSTRACT

The disclosure provides a lighting device that provides light via one or more non-incandescent lamps that can be moved and arranged while operating. The lighting device includes a non-opaque shroud, or casing, that sits upon a base to create a volume within which the non-incandescent lamps rest and can be moved while still providing light. The non-incandescent lamp can use one or more light-emitting diodes (LEDs). The non-incandescent lamps can provide illumination with minimal heat and low power consumption that contributes to user interaction and can be battery powered. In addition to a non-incandescent lamp, a lighting device having at least one of the non-incandescent lamps is disclosed. Additionally, a lighting system having at least one of the lighting devices and a lighting control application is provided herein.

20 Claims, 8 Drawing Sheets

Related U.S. Application Data

(60) Provisional application No. 63/119,404, filed on Nov. 30, 2020.

(51) Int. Cl.
*F21V 3/02* (2006.01)
*F21V 23/06* (2006.01)
*F21V 25/00* (2006.01)
*F21Y 107/00* (2016.01)
*F21Y 115/10* (2016.01)
*H05B 47/19* (2020.01)

(52) U.S. Cl.
CPC ............. *F21V 25/00* (2013.01); *H05B 47/19* (2020.01); *F21Y 2107/00* (2016.08); *F21Y 2115/10* (2016.08)

(58) Field of Classification Search
CPC . F21L 4/027; F21S 9/02; H05B 47/19; H05B 45/10; H05B 47/165; H05B 47/24; H05B 47/25; F21Y 2107/00; F21Y 2115/10
See application file for complete search history.

(56) References Cited

U.S. PATENT DOCUMENTS

| | | | | |
|---|---|---|---|---|
| 11,713,869 | B2 * | 8/2023 | Waddell ................. | H05B 47/19<br>362/183 |
| 2010/0201270 | A1 | 8/2010 | Kuo | |
| 2018/0306395 | A1 * | 10/2018 | Conrad ................... | F21K 9/232 |
| 2019/0107259 | A1 * | 4/2019 | Doberstein ............... | F21V 3/02 |

* cited by examiner

LIGHTING DEVICE HAVING MOVEABLE, NON-INCANDESCENT LAMP STICKS AND A METHOD OF OPERATING THE LIGHTING DEVICE

CROSS-REFERENCE TO RELATED APPLICATION

This application is a continuation of U.S. Non-Provisional patent application Ser. No. 17/538,580 filed by Brewster Waddell, et al. on Nov. 30, 2021, entitled "A LIGHTING DEVICE HAVING MOVEABLE, NON-INCANDESCENT LAMP STICKS AND A METHOD OF OPERATING THE LIGHTING DEVICE", which claims benefit of U.S. Provisional Application Ser. No. 63/119,404, filed by Brewster Waddell, et al. on Nov. 30, 2020, entitled "A LIGHTING DEVICE HAVING MOVEABLE, NON-INCANDESCENT LAMP STICKS AND A METHOD OF OPERATING THE LIGHTING DEVICE," wherein both are commonly assigned with this application and are incorporated herein by reference in their entirety.

TECHNICAL FIELD

This application is directed, in general, to lamps and, more specifically, to an adjustable lighting system.

BACKGROUND

Incandescent lamps have been used to light the world for over a century. Incandescent lamps, or light bulbs, provide light by running electrical current through a wire filament to make it glow. A concern of the electrical current flowing though the wire filament is heat. Another concern is the amount of power needed compared to the amount of light provided by incandescent lamps.

SUMMARY

In one aspect, a lighting device is disclosed. In one example, the lighting device includes: (1) a first electrical contact, (2) a second electrical contact, (3) power circuitry configured to provide an operating signal to the first electrical contact and the second electrical contact, and provide a system voltage for the lighting device, and (4) at least one moveable, non-incandescent lamp having two terminals that complete a circuit between the first electrical contact, the second electrical contact, and the power circuitry when contacting the first electrical contact and the second electrical contact.

In another aspect a non-incandescent lamp is disclosed. In one example, the non-incandescent lamp includes: (1) a first terminal, (2) a second terminal, (3) a non-opaque cylinder with a pair of conductive end caps that are electrically connected to the first and the second terminals and located on opposite ends of the non-opaque cylinder, (4) a first printed circuit board located in a first one of the pair of conductive end caps and electrically connected thereto and a second printed circuit board located in a second one of the pair of conductive end caps and electrically connected thereto, and (5) an LED circuit located within a volume defined by the cover and the pair of conductive end caps and connected between the first printed circuit board and the second printed circuit board, wherein the first and second terminals are terminals of the LED.

In yet another aspect, a lighting system is disclosed. In one example, the lighting system includes: (1) at least one lighting device having (1A) a first electrical contact, (1B) a second electrical contact, (1C) power circuitry configured to provide an operating signal to the first electrical contact and the second electrical contact, and provide a system voltage for the lighting device, and (1D) a system control circuit configured to receive a user input and provide, to the power circuitry, a lighting control signal for controlling the operating signal, and (2) at least one moveable, non-incandescent lamp having two terminals that complete a circuit between the first electrical contact, the second electrical contact, and the power circuitry when contacting the first electrical contact and the second electrical contact.

BRIEF DESCRIPTION

Reference is now made to the following descriptions taken in conjunction with the accompanying drawings, in which.

DETAILED DESCRIPTION

In addition to the function of providing light, some incandescent lamps are also used for decorative purposes or as conversation pieces. Such lamps can also be interactive wherein a person can adjust lighting to their desire. Typically, these types of lamps are closed devices to protect a user from the heat of the wire filament when operating and also plug into a power source, such as a wall outlet.

The disclosure provides a lighting device that provides light via one or more non-incandescent lamps that can be moved and arranged while operating. The lighting device includes a non-opaque shroud, or casing, that sits upon a base to create a volume within which the non-incandescent lamps rest and can be moved while still providing light. A non-incandescent lamp is an electric light without a wire filament. Light-emitting diode (LED) lamps are examples of non-incandescent lamps. The non-incandescent lamps can provide illumination with minimal heat that contributes to user interaction and can be battery powered. The lighting device is also water resistant, if not water proof, and can be used outside.

The lighting device can be part of a lighting system that is controlled by a computing device executing a lighting control application. The computing device can be a smart phone, a computing pad, a computing tablet, a laptop, etc. A smart phone application is one example of a lighting control application that can act as a control interface that provides control commands or signals to a system control circuit of a lighting device or devices. The application can be a computer program product having a series on operating instructions stored on a non-transitory computer readable medium that direct a processor to operate according to processes such as described herein, e.g., control lighting device(s). FIGS. 1-7B provide examples of a lighting device, lighting system and method of operation.

Figure 1:
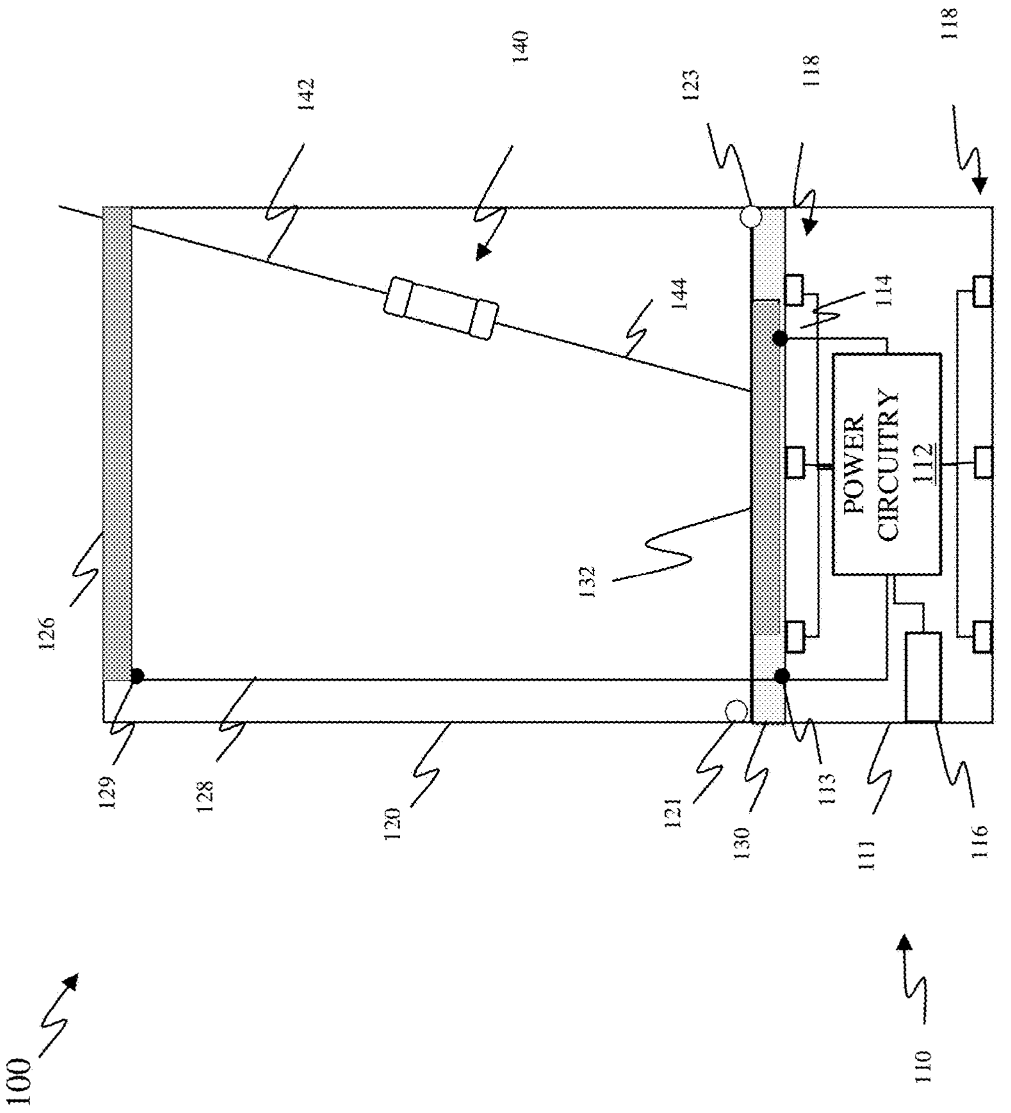
FIG. 1 illustrates a diagram of an example of a lighting device constructed according to the principles of the disclosure.

FIG. 1 illustrates a diagram of a side view of an example of a lighting device 100 constructed according to the principles of the disclosure. The lighting device 100 includes a base 110 and a non-opaque shroud 120, also referred to as a non-opaque casing (referred to herein as NOC 120), which is coupled to the base 110. The NOC 120 includes an open end and an opposite base end, which is coupled to the base 110. The shape or geometry of the NOC 120 and the base 110 can vary. For example, the cross section of the NOC 120 can be that of a star, a triangle, a circle, a rectangle, etc. The NOC 120 can also be in the shape of a bowl. The shape of the base 110 can correspond to that of the NOC 120. In FIG. 1, the NOC 120 and base 110 have the geometry of a cylinder and are removeably coupled together.

Figure 7B:
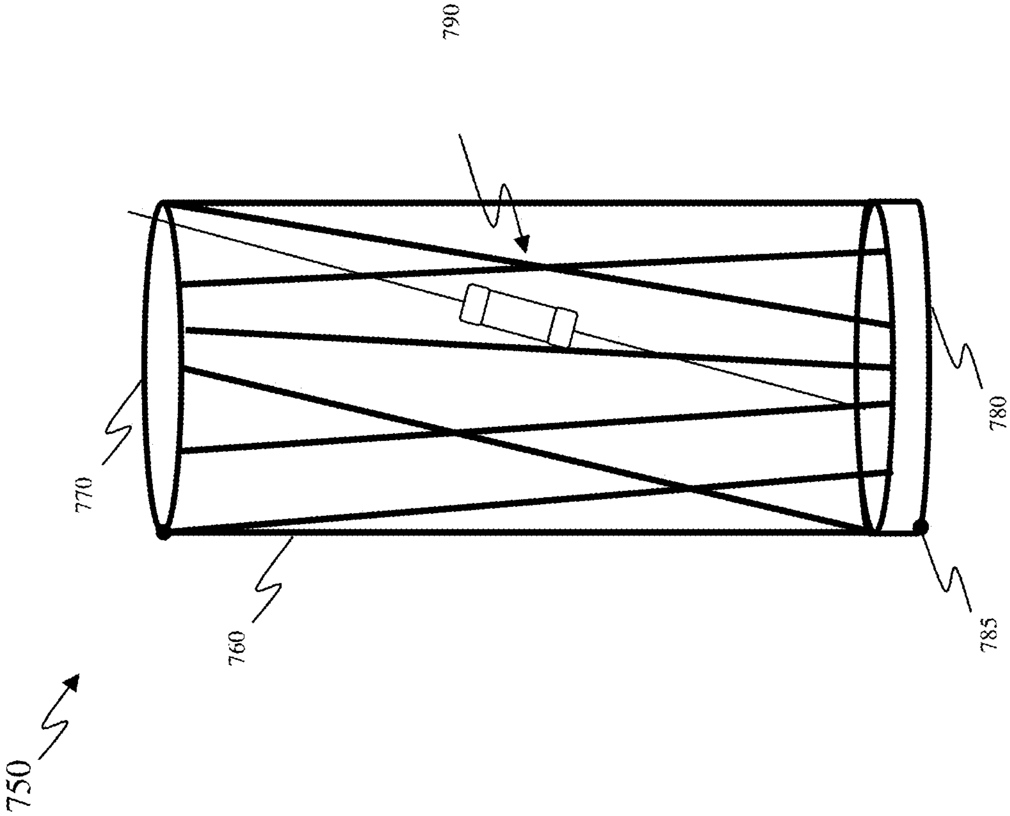
FIGS. 7A and 7B illustrate different examples of a NOC constructed according to the principles of the disclosure.
Figure 7A:
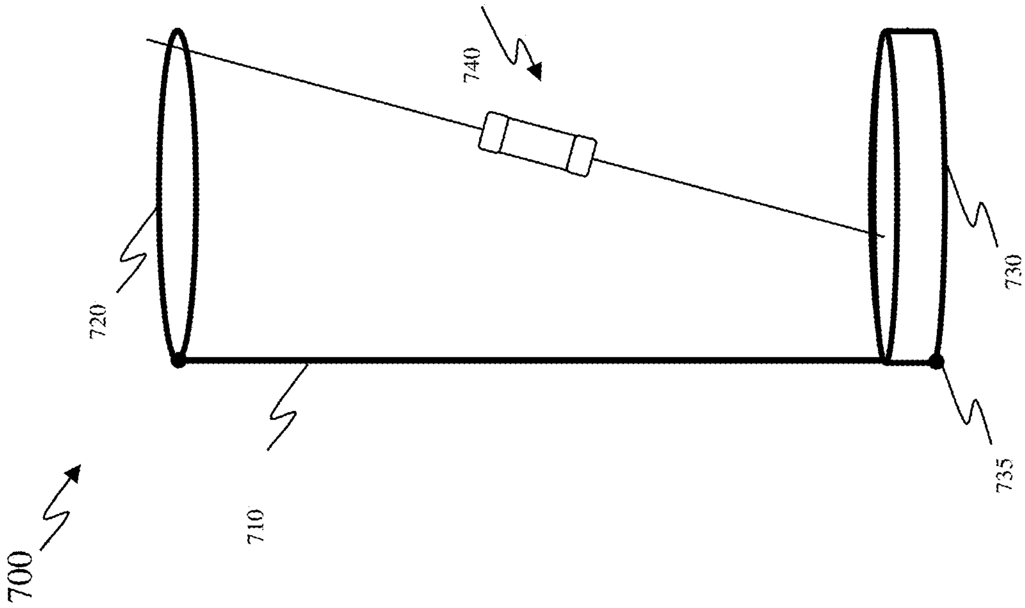

The NOC 120 can be constructed of a translucent or transparent material, such as glass, a plastic (including a thermoplastic), or a polycarbonate. The NOC 120 can be solid or have openings. The NOC 120, or a portion thereof, can also be constructed of a conductive material such as shown in the examples of FIGS. 7A and 7B. FIG. 7A provides an example of a rigid connector or conductive arm that is used for the NOC 120. In FIG. 7B, the NOC 120 is a lattice of pieces, such as rigid pieces (wherein at least one is a connector). The NOC 120 can have other configurations as long as the NOC 120 is sufficient to support the top portion of the lighting device and provide electrical connectivity thereto. The base 110 can be constructed of a non-conductive material, such as a plastic.

The lighting device 100 can be used both indoors and outdoors and is at least water resistant if not considered as a waterproof device. For example, the base 110 can have ingress protection to prevent water/dust incursion into the components located within the housing of the base 110, and the NOC 120 can include one or more opening (i.e., drains) at the end coupled to the base 110 to allow liquid to escape. Drain 121 illustrates such an example of a drain. A drain can also be two openings or notches that align with one opening in the casing bottom 130 and the other opening in the base 110, such as illustrated by drain 123 in FIG. 1.

At the base end, a casing bottom 130 is attached to the NOC 120. The casing bottom 130 can be permanently attached to the NOC 120 and the casing bottom 130 can be removeably coupleable to the base 110. As such, the casing bottom 130 can be non-destructively separated from the base 110 and can be reconnected to the base 110. For example, the casing bottom 130 and the top of the base 110 can be configured with a mechanical interface (not shown in FIG. 1), such as threads, that allow the casing bottom 130 to twist on to the base 110, lock in place, and then be removed by twisting off. Other non-permanent connections can also be used. In some examples, the base 110 and the casing bottom 130 can be permanently attached. In addition to an interface with the base 110, the casing bottom 130 also includes a contact plate 132.

The open end of the NOC 120 has an exposed electrical contact 126. The exposed electrical contact 126 can extend along a portion of the open end or an entirety of the open end of the NOC 120. In FIG. 1, the exposed electrical contact extends around a portion of a rim of the open end. For example, the exposed electrical contact 126 can be a conductive rim that extends along at least a portion of the circumference of the open end of the NOC 120. The NOC 120 also includes a conductor 128 that electrically connects the exposed electrical contact 126 to the casing bottom 130 via electrical connection 129. The conductor 128 can be integrated into the NOC 120 or affixed to the inside or outside of the NOC 120. The NOC 120 can be or can include a metal filament or a conductive coating that operates as the conductor 128. More than one conductor can be used when multiple exposed electrical contacts are positioned separately (not electrically connected) along the rim of the open end of the NOC 120.

The base 110 includes a housing 111 and located within the housing 111 is power circuitry 112 that is configured to provide an operating signal to the contact plate 132 and the exposed electrical contact 126. The power circuitry 112 can be electrically connected to the conductor 128 (and the exposed electrical contact 126) and the contact plate 132 via corresponding electrical connections in the base 110 and the casing bottom 130. Electrical connections 113 and 114 provide examples of such corresponding connections. The casing bottom 130 and base housing 111 can have alignment tabs (not shown in FIG. 1) to assist in connecting the casing bottom 130 to the housing 111 and ensure sufficient electrical conductivity for the electrical connections 113, 114, when coupled together.

The base 110 also includes a charging port 116 and charging contacts 118 that are connected to the power circuitry 112. The charging port 116 can be a USB port that provides charging power to a rechargeable power source (not shown in FIG. 1) of the power circuitry 112. The charging contacts 118 are constructed of an electrical conductive material, such as a type of metal, and can also be electrically connected to the rechargeable power source and used for providing charging power to the rechargeable power source. The charging port 116, for example, can provide a charging voltage of 5 volts and the charging contacts 118 can be used to deliver a charging voltage of 12 volts for simultaneous charging of multiple bases. When the base 110 is separated from the NOC 120, multiple bases can be stacked such that the charging contacts 118 are aligned to allow simultaneous charging of multiple bases. The number of charging contacts 118 can vary. The size and shape of the base 110 can also vary and can correspond to the size and shape of the NOC 120. As noted above, FIGS. 7A and 7B provide examples of different types of NOCs that can be used.

The lighting device 100 also includes a moveable, non-incandescent lamp 140 having two terminals, a first terminal 142 and a second terminal 144, which complete a circuit between the exposed electrical contact 126, the contact plate 132, and the power circuitry 112 when contacting the exposed electrical contact 126 and the contact plate 132. The non-incandescent lamp 140 is a low-power light source that utilizes a voltage that is sufficiently low enough for safe handling by users and is favorable for battery power. For example, the operating voltage for the non-incandescent lamp 140 can be 3 volts, but other voltages (higher or lower) can be used. The lighting device 100 can include multiple non-incandescent lamps.

Figure 2:
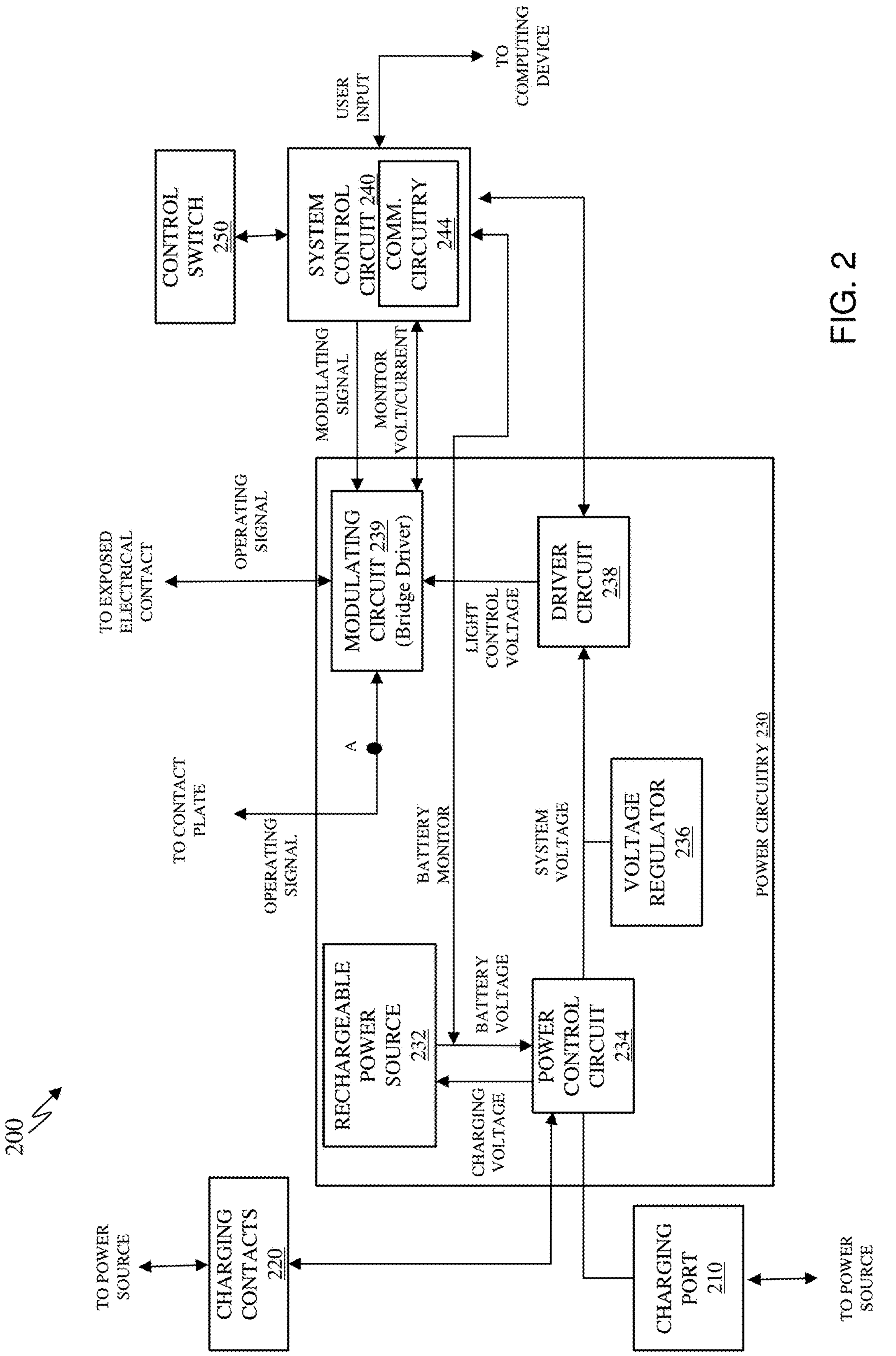
FIG. 2 illustrates a block diagram of an example of components of a base of a lighting device constructed according to the principles of the disclosure.
Figure 6:
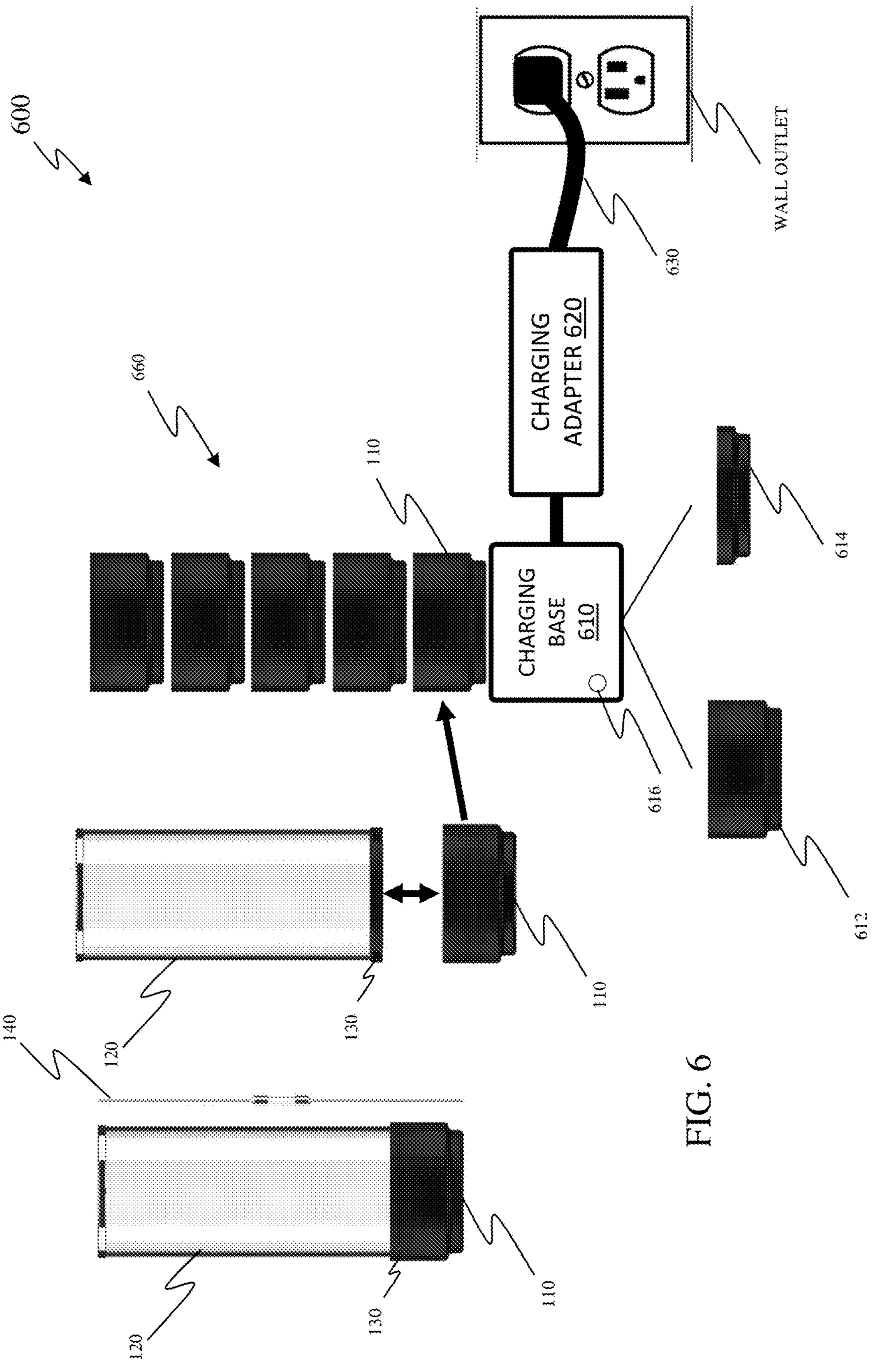
FIG. 6 illustrates a diagram of an example of a charging system that can charge multiple bases according to the principles of the disclosure.

FIG. 2 illustrates a block diagram of an example of a base 200 for a lighting device constructed according to the principles of the disclosure. The base 200, for example, can be base 110 of lighting device 100 illustrated in FIG. 1. The base 200 includes a charging port 210, charging contacts 220, power circuitry 230, a system control circuit 240, and a control switch 250. The charging port 210 and the charging contacts 220 are configured to receive and deliver a charging voltage to a rechargeable power source 232 of the power circuitry 230 via a power control circuit 234 of the power circuitry 230. The charging port 210 can be a USB port that can deliver the charging voltage via a charging adapter connected to a power source. For example, the charging adapter can be a transformer connected to a standard outlet, such as a 120 volt wall socket. The type of charging adapter can vary depending on the voltage of the wall outlet (such as used in different countries). The charging contacts 220 can deliver a charging voltage of greater voltage compared to the charging port, and can be utilized for the simultaneous charging of multiple bases stacked together. FIG. 6 illustrates an example of a charging system that can be used for simultaneously charging multiple bases. The charging contacts of the multiple bases align and provide a charging current, via a charging base, for the rechargeable power source of each base.

The power circuitry 230 includes the rechargeable power source 232 (i.e., a battery), a power control circuit 234, a voltage regulator 236, a driver circuit 238, and a modulating circuit 239. The power control circuit 234 is configured to receive a charging voltage and control delivery of the charging voltage to the rechargeable power source 232 for charging. The power control circuit 234 can be configured to receive a charging voltage of different values. For example, a low charging voltage can be provided via the charging port 210 and a higher charging voltage can be provided via the charging contacts 220. The power control circuit 234 also provides a system voltage from a battery voltage provided by the rechargeable power source 232. The system voltage is provided to the driver circuit 238 that is configured to derive a light control voltage. The light control voltage can be higher or lower than the system voltage. The voltage regulator 236 is configured to control/regulate the system voltage from the power control circuit 234. The modulating circuit 239 is configured to modulate the light control voltage according to a user input and provide an AC signal as an operating signal to the exposed electrical contact and the contact plate of a NOC, such as the exposed electrical contact 126 and the contact plate 132 of FIG. 1. In some examples, the operating signal can be a DC signal.

The user input provided to the modulating circuit 239 can be received from a computing device via the system control circuit 240. The system control circuit 240 can be a microcontroller or another type of processor that is configured to provide the modulating signal from the user input or inputs, and provide other functions to control operation of a lighting device, such as via the user inputs. The system control circuit 240 includes communication circuitry 244 that transmits and receives (i.e., communicates) data, including the user inputs, with the computing device via a wireless network. The wireless network can be a Bluetooth network, such as a Bluetooth Mesh.

The computing device can execute a lighting control application that interfaces with the base 200 via the wireless network. The system control circuit 240 can also receive user inputs via the control switch 250. The control switch 250 can be integrated with the base 200 and configured to provide brightness controls for a non-incandescent lamp or lamps of the lighting device. The brightness controls can include one or more different types of controls such as: simply on or off, settings for different brightness levels such as low, medium, and high (discrete brightness controls), and variable brightness controls, such as a dimmer. The brightness controls can also include a mode that causes the flashing of the non-incandescent lamps. The mode, referred to as a pattern mode, can change the brightness of the non-incandescent lamps according to various patterns that correspond to, for example, a heartbeat, a wave, light flickering, etc. In some example, flashing of the non-incandescent lamps can be coordinated with music, such as via the system control circuit 240. The base 200 can include more than one switch with the functions divided there between. Similar controls provided by the control switch 250 can also be provided to the system control circuit 240 from the computing device according to user inputs. As such, the pattern mode can be controlled by the computing device or a switch/button on the base 200.

The system control circuit 240 is also configured to monitor the battery voltage and the power that is delivered to the contact plate and the exposed electrical contact via the modulating circuit 239. By monitoring the battery voltage of the rechargeable power source 232 the system control circuit 240 can provide battery protection, such as to protect the rechargeable power source 232 from excessive discharge. The communication circuitry 244 can send the monitoring information to the computing device. In some examples, alarms can be generated based on the monitoring information. The alarms can be provided to the computing device to inform a user.

The system control circuit 240 is further configured to monitor currents on the exposed electrical contact and the contact plate and effect a safe shutdown of the operating signal when excessive current is detected. The excessive current can be due to, for example, either a fault or excessively low impedance placed between the exposed electrical contact and the contact plate. The system control circuit 240 can compare the monitored currents to predetermined threshold values to detect a problem and shut down the operating signal. The system control circuit 240 can monitor the voltage and current via the modulating circuit 239. The system control circuit 240 can also or alternatively monitor the current or voltage at a node using, for example, a shunt resistor. Node A is illustrated in FIG. 2 as an example of a place for monitoring.

Figure 3A:
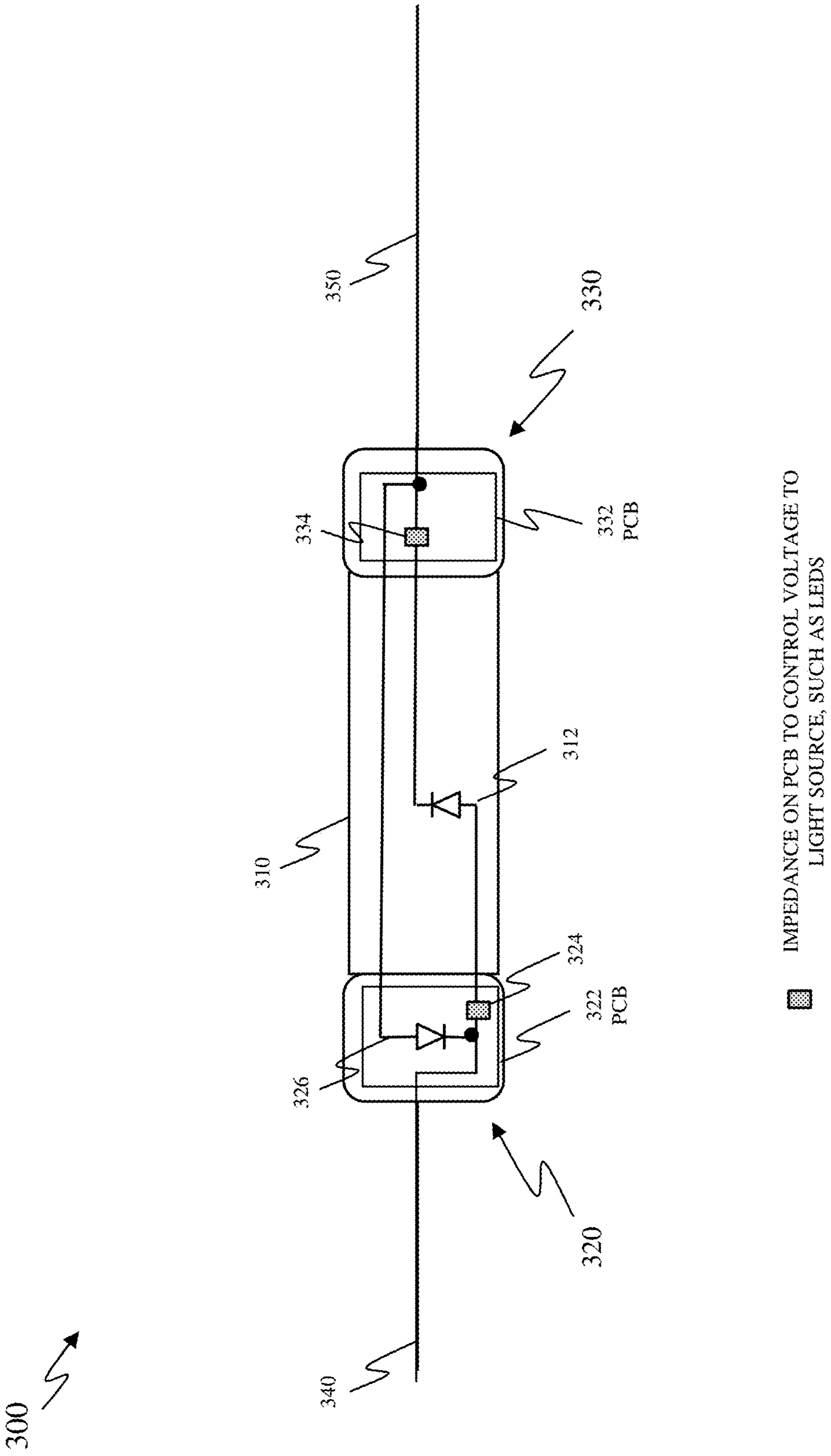
FIG. 3A illustrates a diagram of an example of a moveable, non-incandescent lamp constructed according to the principles of the disclosure.

FIG. 3A illustrates a diagram of an example of a moveable, non-incandescent lamp 300 constructed according to the principles of the disclosure. The non-incandescent lamp 300 includes a cover 310, two end caps and two terminals. The two end caps are denoted as first end cap 320 and second end cap 330, and the two terminals are denoted as first terminal 340 and second terminal 350. The first and second terminals 340, 350, can be conductive rods. As illustrated, the first and second terminals 340, 350, are located on opposite ends of the cover 310 and extend away from the cover 310.

The cover 310 can be a non-opaque cylinder, such as a glass tube, and can have two open ends. The cover 310 can also be of another shape or geometry. At each opposite ends of the cover 310 is one of the two end caps 320 and 330. Within each of the end caps 320, 330, is a printed circuit board, denoted as PCB 322 and PCB 332, which is electrically connected to each respective end cap. One or both of the PCBs 322, 332, can be connected to their respective end cap via a solderless connection. A connection that provides both a mechanical and an electrical connection can be used. For example, a spring mechanism (not shown in FIG. 3A) can be used for the solderless connection. The spring mechanism can provide both a mechanical and electrical connection between the PCBs, the end caps, and the respective terminals, such as PCB 322, first end cap 320, and first terminal 340. Each of the PCBs 322, 332, includes connections/circuitry that connects a light source 312 within the cover 310 to end caps 320 and 330. For example, each of the PCBs 322, 332, can connect spring mechanisms to the light source 312. One or more of the PCBs 322, 332, can also include an impedance, such as a resistor, that can be used to control voltages delivered to the light source 312. The impedance, for example, can be used to manage voltage threshold differences between other non-incandescent lamps. Each of the PCBs 322, 332, can include an impedance. Impedance 324 is shown on PCB 322 and impedance 334 is shown on PCB 332 as examples.

Figure 3B:
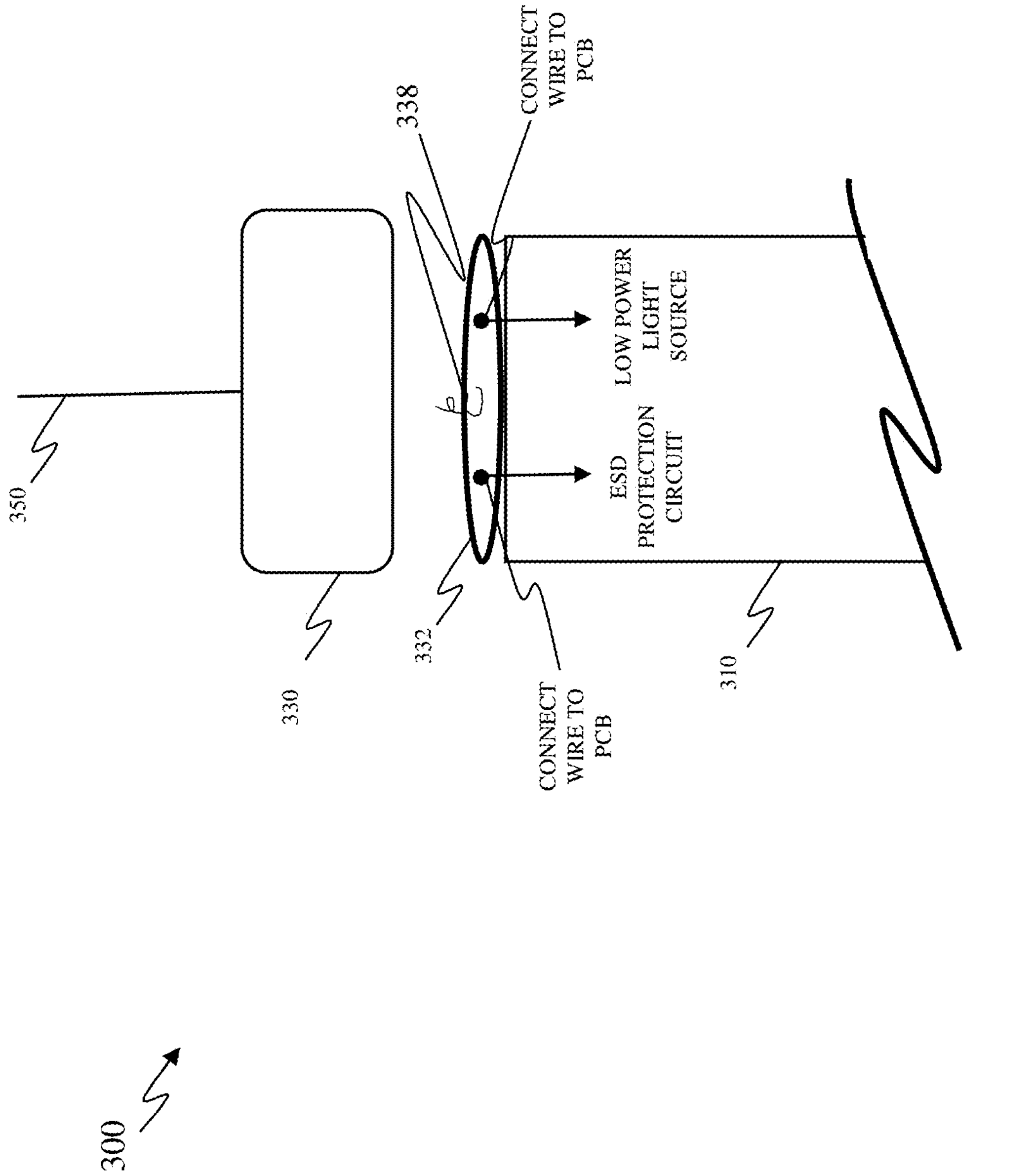
FIG. 3B illustrates a diagram of one end of the moveable, non-incandescent lamp of FIG. 3A showing the connection between the cover, the PCB, and the end cap in more detail.

One of the printed circuit boards, PCB 322 in the illustrated example, includes an electrostatic discharge (ESD) protection circuit 326 that is electrically coupled to each of the first and second terminals 340, 350, via the printed circuit boards PCB 322 and PCB 332. The ESD protection circuit 326 can be a conventional circuit that is configured to protect the light source 312 from electrostatic discharge. The ESD protection circuit 326 can include one or more diodes that are connected in parallel to the light source 312. FIG. 3B illustrates a more detailed picture of connection between the cover 310, the PCB 332, and the end cap 330 at the second terminal 350 end of the non-incandescent lamp 300 of FIG. 3A.

In FIG. 3B, PCB 332 is circular and fits against the end of the cover 310 with the two wires for the ESD protection circuit 326 and the low power light source 312 extending through the PCB 332 and connected, such as via solder, to the PCB 332. The spring mechanism 338 is shown for connecting the PCB 332 to the end cap 330 and the second terminal 350. In addition to the spring mechanism 338, an adhesive can also be used for connecting the PCB 332 to the end of the cover 310 and the end cap 330 to the cover 310. The end cap 330 fits over the end of the cover 310 and encloses the PCB 332. The PCB 322 at the first terminal end of the cover 310 can be similarly connected.

The cover 310 can completely encompass the light source 312 and with the end caps 320, 330, provide a protected environment for the light source 312. For example, the cover 310 and end caps 320, 330, can fit together to prohibit, or at least reduce, the incursion of dust and liquids within the volume of the cover 310 to protect the light source 312. As noted above, the light source 312 can be an LED circuit that includes one or more LEDs. The LEDs can be arranged in one or more straight lines that run parallel with the length of the cover 310 and the first and second terminals 340, 350. The LEDs can also be arranged in other configurations, such as in a spiral, within the cover 310. The non-incandescent lamps of FIG. 1 and FIG. 4 can be, or can be similarly constructed as, the non-incandescent lamp 300.

Figure 4:
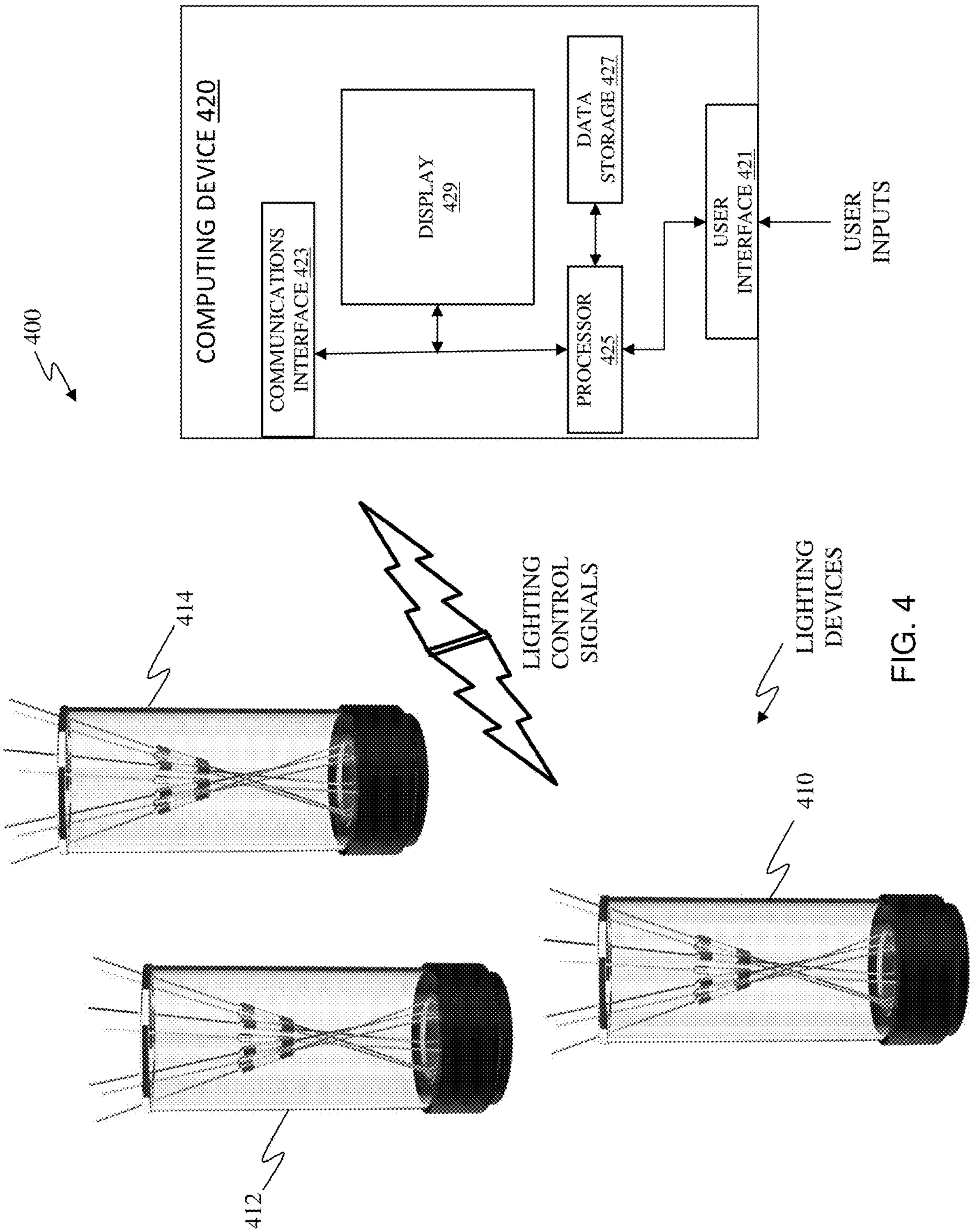
FIG. 4 illustrates a diagram of an example of a lighting system constructed according to the principles of the disclosure.

FIG. 4 illustrates a diagram of an example of a lighting system 400 constructed according to the principles of the disclosure. The lighting system 400 includes lighting devices 410, 412, 414, and a computing device 420 that wirelessly communicates with one or more of the lighting devices 410, 412, 414. In FIG. 4, three lighting devices are illustrated but the lighting system can include more or less than the three illustrative lighting devices 410, 412, 414, that are shown. Each of the lighting devices 410, 412, 414, includes multiple non-incandescent lamps. The non-incandescent lamps can be like the non-incandescent lamp 300 and the lighting devices 410, 412, 414, can be like the lighting device 100.

The computing device 420 is configured to control the operation of the lighting devices. The computing device 420 can be a smart phone, a computing pad, a computing tablet, a laptop, etc., that executes an application for wirelessly interfacing with the lighting devices 410, 412, 414. The computing device 420 can also be another type of computing device that is specifically designed and constructed for operating the lighting devices 410, 412, 414. The computing device 420 can receive user inputs that direct the lighting control application to control the lighting devices 410, 412, 414. The user inputs can be in different forms. Accordingly, the computing device 420 can include one or more user interfaces configured to receive user inputs. The user interface(s) can be a keyboard, a touchpad, a microphone, etc. A single user interface 421 is illustrated in FIG. 4.

In addition to one or more user interfaces, the computing device includes a communications interface 423 that wirelessly communicates with the lighting devices 410, 412, 414, a processor 425 that is configured to execute the lighting control application, and data storage 427 configured to store the lighting control application and other instructions for operating the computing device 420. The lighting control application can be used to control the lighting devices 410, 412, 414, individually, as a single group, or as more than one group. The application can be a computer program product having a series of operating instructions stored on a non-transitory computer readable medium that direct the processor 425 to operate according to processes such as described herein. For example, the processor 425 can generate a lighting control signal to direct the operation of one more lighting device. The method 500 provides an example of generating a lighting control signal. The operating instructions can represent an algorithm or algorithms corresponding to the various features of the application.

The communications interface 423 can be configured to wirelessly communicate with the communication circuitry of each of the lighting devices 410, 412, 414. The wireless communication can be via a wireless network like a Bluetooth network. The data storage 427 can be a non-transitory computer readable medium. The communications interface 423 can also communicate with another computing device that then communicates with the lighting devices 410, 412, 414. As such, the computing device 420 can provide an interface to a system controller that then communicates with the lighting devices 410, 412, 414, and controls operation thereof based on the user inputs. The processing functions can be distributed between a processor of the system controller and the processor 425 of the computing device 420. The wireless communications can be secure communications according to various communication protocols. The computing device 420 can receive monitoring information from the lighting devices 412, 414, 416, via the communications interface 423 and provide this information to the user.

The computing device 420 can also include a display 429 that is configured to provide a visual interface with a user. The display 429 can show monitoring information received from the lighting devices 412, 414, 416, including alarms, and show selections for a user to select as a user input. The display 429 can also be a touchpad for receiving user inputs. The display 429 and one or more of the other components of the computing device 420 can be coupled together via conventional connections.

Figure 5:
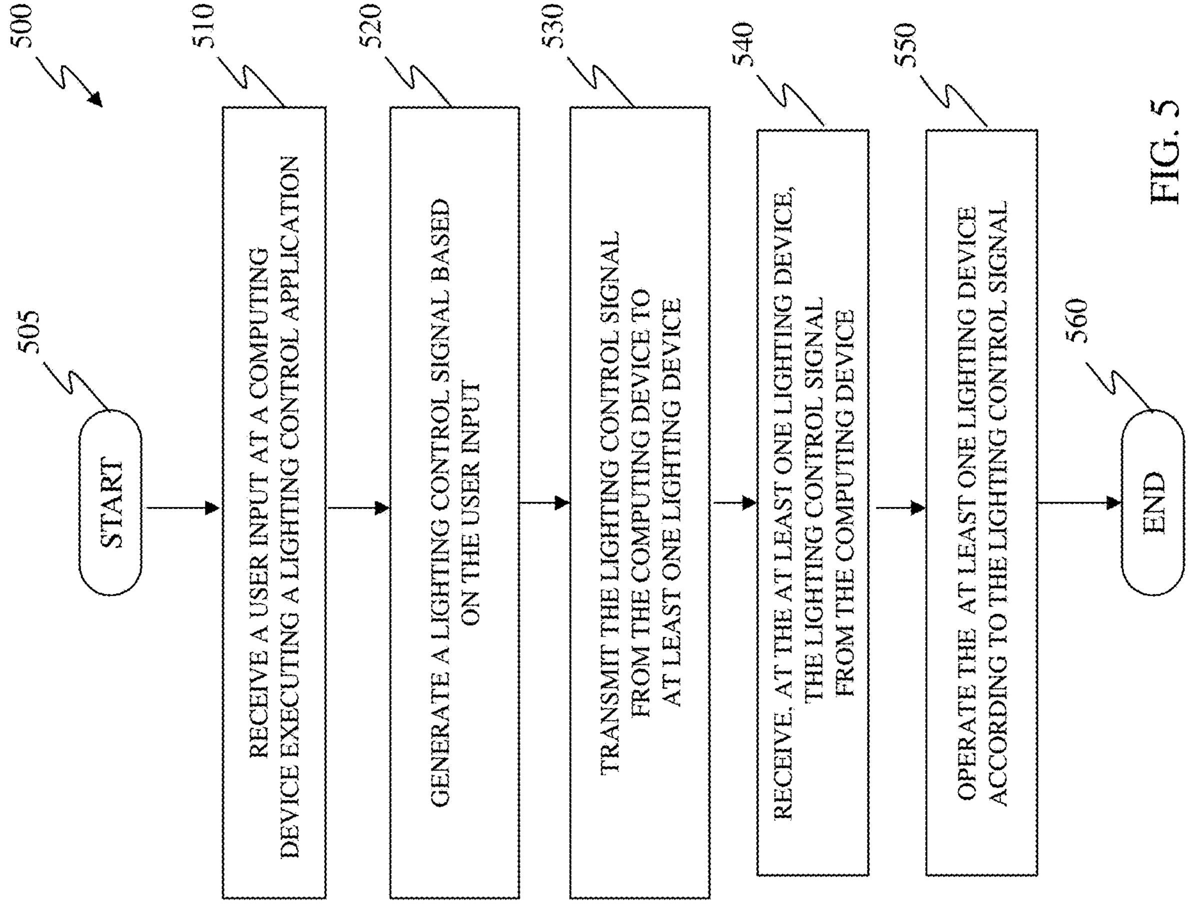
FIG. 5 illustrates a flow diagram of an example of a method of operating a lighting device carried out according to principles of the disclosure.

FIG. 5 illustrates a flow diagram of an example of a method 500 of operating a lighting device carried out according to principles of the disclosure. Though a single lighting device is discussed, the method 500 can be applied to more than one lighting device. The lighting device can be part of a lighting system such as shown in FIG. 4. The method 500 starts in a step 505.

In step 510, a user input is received at a computing device that is executing a lighting control application. The user input can be received by one or more different types of user interfaces. For example, the user input can be spoken and received by a microphone of the computing device. The user input can also be typed or entered via a keypad or a touchscreen. The computing device can be, for example, the computing device 420 of FIG. 4.

A lighting control signal is generated in a step 520 based on the user input. A processor of the computing device can generate the lighting control signal via the light control application and the user input. The lighting control signal can be used to control modulation of a light control signal to generate an operating signal for one or more non-incandescent lamps. The lighting control signal can also be used to provide brightness controls for operating the lighting device. For example, the lighting control signal can be used to control a pattern mode and change between different pattern modes.

The lighting control signal is transmitted from the computing device to at least one lighting device in step 530. The lighting control signal is transmitted wirelessly and multiple lighting control signals can be sent. The lighting control signal(s) can be sent via a communications interface of the computing device.

In step 540, the lighting control signal is received at the at least one lighting device. Communications circuitry of the lighting device can receive the lighting control signal from the computing device via a wireless network, such as a Bluetooth compliant network. The communications circuitry can provide the lighting control signal to a control circuit of the lighting device.

The at least one lighting device is operated in step 550 according to the lighting control signal received from the computing device. The method 500 ends in a step 560.

FIG. 6 illustrates a diagram of an example of a charging system 600 that can be used to simultaneously charge multiple bases of lighting devices according to the principles of the disclosure. The charging system 600 includes a charging base 610 and a charging adapter 620. In FIG. 6 the charging base 610 and the charging adapter 620 are shown as two separate devices. In some examples, the charging adapter 620 can be integrated with the charging base 610. The charging system 600 also includes a power cord 630 that is used to connect to a power source, such as a wall outlet as shown in FIG. 6. A stack of bases 660 is positioned on top of the charging base 610 for simultaneous charging.

In addition to the charging system 600, FIG. 6 also includes lighting device 100 to illustrate how the base 110 of the lighting device 100 can be removed from the NOC 120 and placed on the charging base 610 for charging. The lighting device 100 is first shown with the base 110 connected to the NOC 120 via the casing bottom 130 and the non-incandescent lamp 140 outside of the NOC 120. The base 110 and the NOC 120 are then shown decoupled. Once separated, the base 110 can be placed on the charging base 610 for charging. In FIG. 6, base 110 is the bottom base of the stack of bases 660. The charging contacts for each base of the stack of bases 660, including base 110, are aligned to allow current flow from the charging base 610 through the stack of bases 660 to provide power to and charge the rechargeable power sources of each of the stack of bases 660. Each of the bases of the stack of bases 660 can include a rechargeable power source and electronics as shown with base 200 of FIG. 2.

The charging base 610 is configured to receive power via the charging adapter 620 and deliver the power to base 110 and the other stack of bases 660 that are electrically connected to the charging base 610. The charging base 610 can include charging contacts that align with the charging contacts 118 of base 110 for charging of the stack of bases 660. In addition to charging contacts, the charging base 610 can include power circuitry that receives a charging voltage from the charging adapter 620 and provides the charging voltage to the stack of bases 660 via the charging contacts. The power circuitry can be configured to determine when the rechargeable power sources of each of the stack of bases 660 have been fully charged and can be removed. An indicator can be used to indicate when charging is complete. The indicator can be a visual indicator such as a light, or the charging base can include a speaker to provide an audible indication. A single indicator light 616 is shown in FIG. 6 as an example of a charging status indicator. Stacked lights that correspond to the stack of bases or other individual indicators can be used to show when a particular one or ones of the stack of bases 660 have been fully charged. Each one of the stack of bases 660 can also include a charging status indicator. The charging base 610 and each of the stack of bases 660 can include alignment tabs to ensure proper positioning for charging via the charging contacts.

As shown in FIG. 6, the charging base 610 can have the same shape or a different shape as base 110 and the other ones of the stack of bases 660. Charging base 612 provides an example of a charging base having the same shape and charging base 614 provides an example of a different shape. Regardless the shape of charging base 610, the charging base 610 includes the charging contacts and power circuitry for charging the stack of bases 660.

The charging adapter 620 is configured to convert power from the power source to the charging voltage. The charging adapter 620 can be an AC to DC adapter that, for example, converts 120 volts from the wall outlet to a 12 volt charging voltage. The charging adapter 620 can be a conventional AC to DC adapter.

FIGS. 7A and 7B illustrate different examples of a NOC constructed according to the principles of the disclosure. FIG. 7A illustrates a NOC 700 that includes a rigid connector or conductive arm 710 connected between the exposed electrical contact 720 and casing bottom 730. An electrical connection 735 is shown to indicate a connection to power circuitry of a base (not shown) when connected to the casing bottom 730. A non-incandescent lamp 740 is also shown to represent a connection between a contact plate of the casing bottom 730 and the exposed electrical contact 720.

FIG. 7B illustrates a NOC 750 that includes a lattice 760 that includes at least one conductor that is connected between the exposed electrical contact 770 and casing bottom 780. An electrical connection 785 is shown to indicate a connection to power circuitry of a base (not shown) when connected to the casing bottom 780. A non-incandescent lamp 790 is also shown to represent a connection between a contact plate of the casing bottom 780 and the exposed electrical contact 770.

The examples described herein were selected and described in order to best explain the principles of the disclosure and the practical application, and to enable others of ordinary skill in the art to understand the disclosure for various examples with various modifications as are suited to the particular use contemplated. The particular examples described herein are in no way intended to limit the scope of the present disclosure as it may be practiced in a variety of variations and environments without departing from the scope and intent of the disclosure. Thus, the present disclosure is not intended to be limited to the embodiment shown, but is to be accorded the widest scope consistent with the principles and features described herein.

The flowchart and block diagrams in the figures illustrate the architecture, functionality, and operation of possible implementations of systems, methods and computer program products according to various examples of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

As will be appreciated by one of skill in the art, the disclosure or parts thereof may be embodied as an apparatus, a method, a system, or a computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Configured to or configured, as used herein, means, for example, designed, constructed, or programmed, with the necessary structure, circuitry, operating instructions, logic, features, and/or combination thereof for performing a task(s) or function(s).

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Those skilled in the art to which this application relates will appreciate that other and further additions, deletions, substitutions and modifications may be made to the described examples.

What is claimed is:

1. A lighting device, comprising:

a base having a housing;

an electrically conductive rim that is a first electrical contact;

a second electrical contact;

power circuitry, located within the housing of the base, configured to provide an operating signal to the electrically conductive rim and the second electrical contact, and provide a system voltage for the lighting device; and at least one non-incandescent lamp having two terminals that complete a circuit between the electrically conductive rim, the second electrical contact, and the power circuitry when contacting the electrically conductive rim and the second electrical contact, wherein the non-incandescent lamp is moveable within a volume defined by the electrically conductive rim and the base.

2. The lighting device as recited in claim 1, wherein the power circuitry receives power from a wall outlet.

3. The lighting device as recited in claim 1, wherein the power circuitry includes a rechargeable power source and a power control circuit, wherein the power control circuit is configured to control charging of the rechargeable power source and provide the system voltage from a battery voltage of the rechargeable power source.

4. The lighting device as recited in claim 1, wherein the power circuitry further includes a driver circuit configured to derive a light control voltage from the system voltage, and a modulating circuit that modulates the light control voltage according to a user input.

5. The lighting device as recited in claim 4, further comprising a system control circuit configured to receive the user input and provide a modulating signal to the modulating circuit for modulating the light control voltage.

6. The lighting device as recited in claim 5, wherein the system control circuit is configured to receive the user input via a wireless interface.

7. The lighting device as recited in claim 1, further comprising a control switch configured to receive input from a user and provide the user input to a system control circuit of the lighting device.

8. The lighting device as recited in claim 1, further comprising a system control circuit configured to effect a shutdown of the operating signal based on detection of excessive current at the electrically conductive rim or the second electrical contact.

9. The lighting device as recited in claim 1, wherein the second electrical contact is a contact plate.

10. The lighting device as recited in claim 1, wherein the non-incandescent lamp is a light emitting diode (LED) lamp having a LED circuit.

11. The lighting device as recited in claim 10, wherein the non-incandescent lamp includes a non-opaque cylinder with conductive end caps that are electrically connected to the two terminals, wherein the two terminals are terminals of the LED circuit contained within the non-opaque cylinder.

12. A non-incandescent lamp, comprising:

a first terminal;

a second terminal;

a non-opaque cylinder with a pair of conductive end caps that are electrically connected to the first and the second terminals and located on opposite ends of the non-opaque cylinder;

a first printed circuit board located in a first one of the pair of conductive end caps and electrically connected thereto via a spring mechanism; and an LED circuit located within a volume defined by the non-opaque cylinder and the pair of conductive end caps and connected between the first printed circuit board and the second printed circuit board, wherein the first and second terminals are terminals of the LED.

13. The non-incandescent lamp as recited in claim 12, wherein the first printed circuit board includes an electrostatic discharge protection circuit.

14. The non-incandescent lamp as recited in claim 12, wherein the first printed circuit board includes an impedance configured to control a voltage delivered to the LED circuit.

15. The non-incandescent lamp as recited in claim 12, further comprising a second printed circuit board located in a second one of the pair of conductive end caps and electrically connected thereto via another spring mechanism.

16. A lighting system, comprising:

multiple lighting devices that each include:

a first electrical contact;

a second electrical contact;

power circuitry configured to provide an operating signal to the first electrical contact and the second electrical contact, and provide a system voltage for the lighting device;

a system control circuit configured to receive a user input and provide, to the power circuitry, a lighting control signal for controlling the operating signal; and at least one non-incandescent lamp having two terminals that complete a circuit between the first electrical contact, the second electrical contact, and the power circuitry when contacting the first electrical contact and the second electrical contact, wherein at least two of the multiple lighting devices include a base having a rechargeable power source and charging contacts.

17. The lighting system as recited in claim 16, wherein each of the multiple lighting devices further includes a non-opaque casing having first and second ends, wherein the first end has a casing bottom that includes the first electrical contact and the second end has the second electrical contact.

18. The lighting system as recited in claim 16, further comprising a charging system having a charging base that is configured to simultaneously charge the rechargeable power sources of the at least two of the multiple lighting devices using the charging contacts.

19. The lighting system as recited in claim 18, wherein the charging base is configured to simultaneously charge the rechargeable power sources of the at least two of the multiple lighting devices when the bases of the at least two of the multiple lighting devices are stacked on the charging base and the charging contacts of the at least two of the multiple lighting devices align with charging contacts of the charging base.

20. The lighting system as recited in claim 18, further comprising a lighting control application that is computer program product having a series of operating instructions stored on a non-transitory computer readable medium that direct a processor of a computing device to control operations of the at least two of the multiple lighting devices.

* * * * *